US011718045B2

(12) United States Patent
Filou et al.

(10) Patent No.: US 11,718,045 B2
(45) Date of Patent: Aug. 8, 2023

(54) METHOD FOR INCREASING THE DIFFERENCE BETWEEN THE MELTING TEMPERATURE AND THE CRYSTALLIZATION TEMPERATURE OF A POLYAMIDE POWDER

(71) Applicant: Arkema France, Colombes (FR)

(72) Inventors: Gregory Filou, Manneville sur Risle (FR); Cyrille Mathieu, Lyons (FR); Holger Senff, Lescar (FR)

(73) Assignee: ARKEMA FRANCE, Colombes (FR)

(*) Notice: Subject to any disclaimer, the term of this patent is extended or adjusted under 35 U.S.C. 154(b) by 211 days.

(21) Appl. No.: 17/088,033

(22) Filed: Nov. 3, 2020

(65) Prior Publication Data
US 2021/0107235 A1   Apr. 15, 2021

Related U.S. Application Data

(63) Continuation of application No. 15/977,428, filed on May 11, 2018, now Pat. No. 10,836,117, which is a continuation of application No. 12/990,301, filed as application No. PCT/FR2009/050788 on Apr. 29, 2009, now abandoned.

(30) Foreign Application Priority Data

Apr. 29, 2008 (FR) ........................... 0852863

(51) Int. Cl.
C08G 69/26 (2006.01)
B29C 67/04 (2017.01)
C08G 69/04 (2006.01)
C08G 69/08 (2006.01)
C08G 69/16 (2006.01)
C08G 69/28 (2006.01)
C08G 69/44 (2006.01)
C08J 3/12 (2006.01)
C08J 3/28 (2006.01)
B29C 64/153 (2017.01)
C08J 3/14 (2006.01)
B29K 77/00 (2006.01)

(52) U.S. Cl.
CPC ............ B29C 67/04 (2013.01); B29C 64/153 (2017.08); C08G 69/04 (2013.01); C08G 69/08 (2013.01); C08G 69/16 (2013.01); C08G 69/26 (2013.01); C08G 69/28 (2013.01); C08G 69/44 (2013.01); C08J 3/12 (2013.01); C08J 3/14 (2013.01); C08J 3/28 (2013.01); B29K 2077/00 (2013.01)

(58) Field of Classification Search
CPC .......... C08L 77/00; C08L 77/06; C08L 77/02; C08G 69/26; C08G 69/265; C08G 69/36; B29C 64/153; C08J 3/12
See application file for complete search history.

(56) References Cited

U.S. PATENT DOCUMENTS

| | | | |
|---|---|---|---|
| 3,926,924 A | 12/1975 | Edgar et al. | |
| 3,933,762 A | 1/1976 | Naito et al. | |
| 4,055,552 A | 10/1977 | Bukac et al. | |
| 4,334,056 A | 6/1982 | Meyer et al. | |
| 5,422,418 A | 6/1995 | Maj et al. | |
| 5,459,230 A | 10/1995 | De et al. | |
| 5,700,900 A | 12/1997 | Hewel et al. | |
| 5,739,262 A | 4/1998 | Morhenn et al. | |
| 6,245,281 B1 | 6/2001 | Scholten et al. | |
| 10,836,117 B2* | 11/2020 | Filou | C08G 69/28 |
| 2005/0197446 A1 | 9/2005 | Loyen et al. | |
| 2006/0205883 A1 | 9/2006 | Loyen et al. | |
| 2007/0197692 A1 | 8/2007 | Monsheimer et al. | |
| 2008/0249237 A1* | 10/2008 | Hager | C08J 3/128 264/572 |
| 2009/0075081 A1 | 3/2009 | Ouvrard et al. | |
| 2009/0236775 A1 | 9/2009 | Monsheimer et al. | |

(Continued)

FOREIGN PATENT DOCUMENTS

EP    0192515 A1    8/1986
EP    0303530 A1    2/1989

(Continued)

OTHER PUBLICATIONS

Hybart Rates of Crystallization of Copolyamides. I. Random Copolymers of Nylons 6 and 11, J. Applied Polymer Science 1969 pp. 2643-2648, published on Oct. 1969.*
Harvey et al Rates of Crystallization of Copolyamides. 11. Random Copolymers of Nylons 66 and 6, , J. Appl. Polym. Sci., 14,2133-2143 (1970), published on Aug. 1970.*
Acierno, et al., "Effect of short chain branching upon the crystallization of model polyamides-11", Polymer, Elservier Science Publishers B.V., vol. 46, No. 23, (2005), pp. 10331-10338.
Gaymans, R., et al., "3 Polyamides", Synthetic Methods in Step-Growth Polymers, John Wiley & Sons, Inc., (2003), pp. 135-195.
Hybart, et al., Journal of Applied Polymer Science, 1969, p. 2643.
Teergarden Polymer Chemistry: Introduction to an Indispensible Science, pp. 22-23.

(Continued)

Primary Examiner — Gregory Listvoyb
(74) Attorney, Agent, or Firm — Buchanan Ingersoll & Rooney PC

(57) ABSTRACT

A method for reducing the crystallization temperature and the melting temperature of a polyamide powder resulting from the polymerization of at least one predominant monomer, in which the reduction in the crystallization temperature is greater than the reduction in the melting temperature, the method including a step of polymerization of the at least one predominant monomer with at least one different minor comonomer polymerized according to the same polymerization process as the at least one predominant monomer, the at least one minor comonomer being chosen from aminocarboxylic acids, diamine/diacid pairs, lactams and/or lactones, and the at least one minor comonomer representing from 0.1% to 20% by weight of the total blend of the monomers(s) and comonomer(s), preferably from 0.5% to 15% by weight of the total blend, preferably from 1% to 10% by weight of the total blend.

21 Claims, 1 Drawing Sheet

(56) References Cited

U.S. PATENT DOCUMENTS

| | | |
|---|---|---|
| 2010/0013661 A1 | 1/2010 | Hughes et al. |
| 2010/0098880 A1 | 4/2010 | Senff |
| 2010/0113661 A1 | 5/2010 | Senff et al. |
| 2010/0305232 A1 | 12/2010 | Loyen et al. |

FOREIGN PATENT DOCUMENTS

| | | |
|---|---|---|
| EP | 0603813 A1 | 6/1994 |
| EP | 1172396 A1 | 1/2002 |
| EP | 2103643 A1 | 9/2009 |
| FR | 656029 | 6/1928 |
| FR | 2867190 A1 | 9/2005 |
| FR | 2873380 A1 | 1/2006 |
| JP | S60179425 A | 9/1985 |
| JP | S61106624 A | 5/1986 |
| JP | H05310925 A | 11/1993 |
| JP | H06256505 A | 9/1994 |
| JP | 2004346274 A | 12/2004 |
| JP | 2008505243 A | 2/2008 |
| JP | 2009226952 A | 10/2009 |
| JP | 2010514877 A | 5/2010 |
| WO | 2005082973 A1 | 9/2005 |
| WO | 2005082979 A1 | 9/2005 |
| WO | 2005085326 A1 | 9/2005 |
| WO | 2008087335 A2 | 7/2008 |

OTHER PUBLICATIONS

European Search Report/Opinion dated Sep. 10, 2018, issued by the European Patent Office in corresponding European Application No. 18 168 873.0, and an English Translation, (17 pages).

Preliminary Search Report dated Nov. 18, 2008, by the Registered Search Organization in corresponding French Patent Application No. FR 0852863, (3 pages).

Office Action (Notice of Reasons for Refusal) dated Oct. 15, 2013, by the Japanese Patent Office in corresponding Japanese Patent Application No. 2011-506756, and an English Translation of the Office Action. (10 pages).

Search Report dated Sep. 27, 2013, by the Registered Search Organization in corresponding Japanese Patent Application No. 2011-506756, and an English Translation of the Search Report. (28 pages).

\* cited by examiner

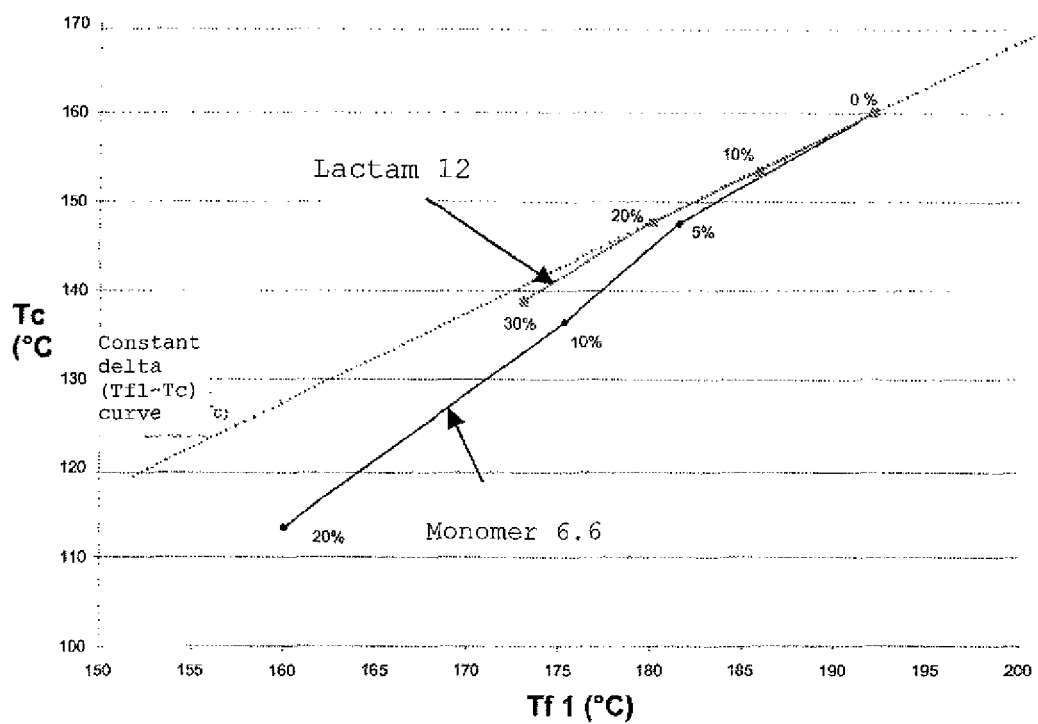

METHOD FOR INCREASING THE DIFFERENCE BETWEEN THE MELTING TEMPERATURE AND THE CRYSTALLIZATION TEMPERATURE OF A POLYAMIDE POWDER

CROSS REFERENCE TO RELATED APPLICATIONS

The present application is a continuation of U.S. application Ser. No. 15/977,428, filed on May 11, 2018, which is a continuation of U.S. application Ser. No. 12/990,301, filed on Dec. 20, 2010, which is a U.S. National Stage of International Application No. PCT/FR2009/050788, filed on Apr. 29, 2009, which claims the benefit of French Application No. 0852863, filed on Apr. 29, 2008. The entire contents of each of U.S. application Ser. No. 15/977,428, U.S. application Ser. No. 12/990,301, International Application No. PCT/FR2009/050788, French Application No. 0852863 are hereby incorporated herein by reference in their entirety.

FIELD OF THE INVENTION

The present invention relates to polyamides, such as copolyamides and copolyesteramides, which have an increased difference between their melting temperature and their crystallization temperature (Tf–Tc). The present invention also relates to a process for manufacturing powders of such copolyamides or copolyesteramides, irrespective of the type of polymerization used during the process: hydrolytic polycondensation, anionic or cationic polymerization.

A large difference between the Tf and the Tc of a polyamide-based powder is particularly useful in many uses, and especially in powder aggregation technology by radiation-mediated melting or sintering, for instance using a laser beam (laser sintering), infrared radiation or UV radiation or any source of electromagnetic radiation that makes it possible to melt the powder in order to manufacture articles.

PRIOR ART

The technology of aggregation of polyamide powders via a laser beam serves to manufacture three-dimensional articles such as prototypes and models, especially in the motor vehicle, nautical, aeronautics, aerospace, medical (prostheses, auditive systems, cell tissues, etc.), textile, clothing, fashion, decorative, electronic casing, telephony, home automation, information technology and lighting sectors.

A thin layer of polyamide powder is deposited on a horizontal plate maintained in a chamber heated to a temperature between the crystallization temperature Tc and the melting temperature Tf of the polyamide powder. The laser aggregates the powder particles at different points in the powder layer according to a geometry corresponding to the article, for example with the aid of a computer which has in its memory the shape of the article and which restitutes this article in the form of slices. Next, the horizontal plate is lowered by a value corresponding to the thickness of the powder layer (for example between 0.05 and 2 mm and generally about 0.1 mm), then a new powder layer is deposited and the laser aggregates powder particles according to a geometry corresponding to this new slice of the article, and so on. The procedure is repeated until the entire article has been manufactured. An article surrounded by powder is obtained inside the chamber. The parts that have not been aggregated thus remain in powder form. Next, the assembly is cooled gently and the article solidifies as soon as its temperature falls below the crystallization temperature Tc. After complete cooling, the article is separated from the powder, which may be reused for another operation.

Immediately after the action of the laser beam, the temperature of the sample is higher than the crystallization temperature (Tc) of the powder. However, it arises that the introduction of a new layer of colder powder causes the temperature of the part to drop rapidly, which, when it passes below said Tc, results in deformations (phenomenon known as curling). Similarly, when the temperature of the powder in the machine comes too close to the melting temperature (Tf) of the powder, this results in setting to a solid around the parts (phenomenon known as caking), which is manifested by the presence of lumps or clumps of powder at certain regions on the surface of the article, instead of having a good definition of the final article.

To avoid these phenomena, it is therefore important to keep the Tc as far away as possible from the Tf of the powder. The difference Tf–Tc of the powder determines the working-temperature window of the device that serves to aggregate the powder particles via radiation-mediated melting. This working window is defined by its upper temperature limit and its lower temperature limit. The upper limit of the working window corresponds to the temperature at which aggregation or caking takes place. The lower limit of the working window corresponds to the temperature at which distortion or deformation or "curling" takes place. This working window of the device is generally estimated as about 10° C. by a person skilled in the art for use of the powder in the machine under good conditions, i.e. without appearance of the phenomena described above, which are the cause of defects on the parts obtained.

Moreover, the highest possible heat of fusion ($\Delta$Hf) is required in order to obtain a good geometrical definition of the manufactured parts. Specifically, if this heat of fusion is too low, the energy provided by the laser is sufficient to sinter by heat conduction the powder particles close to the walls under construction, and thus the geometrical precision of the part is no longer satisfactory.

It is clear that everything that has just been explained regarding the aggregation of polyamide powders by laser beam is valid irrespective of the electromagnetic radiation that causes the melting, whether the melting process is selective or unselective.

U.S. Pat. No. 6,245,281 (EP 0 911 142) describes the use, for selective laser sintering, of polyamide 12 (PA 12) powders with an increased melting point and heat of fusion. Their Tf is within the range from 185 to 189° C., their Tc is within the range from 138 to 143° C. (and so 42° C.<Tf–Tc<51° C.) and their $\Delta$Hf is 112±17 J/g. These powders are obtained by precipitation of a polyamide 12 prepared via ring opening and then polycondensation of lauryllactam, according to the process described in patent DE 2906647 (=U.S. Pat. No. 4,334,056). This process requires several steps, in which PA 12 is first manufactured by condensation and is then dissolved in ethanol between 130 and 150° C., and the ethanol solution is cooled slowly to below 125° C. with stirring, to make the PA 12 precipitate in powder form. One drawback of the powders obtained via this process is the evolution of gas during the process of sintering residual monomers present in these powders, in particular when the manufacturing chamber is maintained at a temperature just below the melting temperature of the polymer. These gaseous monomers, after sublimation, become deposited on the components of the machine, which damages it. In particular, the condensation of these monomers on optical surfaces impairs the manufacturing conditions and leads to reduced performance and precision. To reduce this problem, a complicated intermediate step may be added during the preparation of the polyamide powder. This additional step consists in extracting the residual monomers from the polyamide in hot alcohol, and necessitates an expensive manipulation.

Patent FR 2 867 190 describes a process for manufacturing a polyamide 12 powder with a high Tf (the Tc remaining unchanged) via a synthetic process of anionic type starting with lauryllactam dissolved in a solvent in the presence of a filler and an amide of formula R1-NH—CO—R2. The process of said document consists in placing the solvent in lactam supersaturation state, i.e. at a temperature below the Tc of the lactam in the solvent. The polyamide 12 powders obtained via this process contain very few residual monomers, have a melting point of at least 180° C. and preferably within the temperature range from 182° C. to 184° C., and a crystallization temperature of about 135±1° C. This process involves very precise control and monitoring of the temperature under industrial conditions.

Patent FR 2 873 380 describes a process for increasing the melting temperature and the heat of fusion of a polyamide, without modifying the crystallization temperature of the powder. In this process, it is a matter of increasing the Tf of pre-manufactured polyamides, for example of PA 11, via a water treatment. Polyamide in divided form (granules or powder) is placed in contact in the solid state with water or water vapor at a temperature close to its crystallization temperature Tc, and is then separated from the water and dried. This process thus involves several steps subsequent to the manufacture of the polyamide itself, the drying step being a limiting step of the process.

French patent application 06/56029 relates to a process for manufacturing a seeded powder particle formed from a polyamide shell and a polyamide core. The process uses the anionic polymerization of lauryllactam or caprolactam monomer or a blend thereof dissolved in a solvent in the presence of seeds that are polyamide powder particles. This characteristic core/shell structure of the seeded polyamide powder leads to a much lower Tc, the Tf being unchanged. The powders obtained have a difference Tf–Tc absolute value higher than that of the powders of the prior art. However, the difference obtained between Tf and Tc is not as great as with the process of the abovementioned patent FR 2 867 190.

One aim of the present invention is thus to provide a process for efficiently increasing the difference Tf–Tc of existing polyamides.

In particular, one aim of the present invention is to provide a process for manufacturing polyamide, especially in the form of powder or granules, with an enlarged difference Tf–Tc, which is simple, quick (comprising the fewest possible steps) and easy to perform and which entrains few or no residual monomers liable to affect the functioning of the machines used for the manufacture of articles by powder aggregation.

The prior art discloses various means for adapting the powders used in order to improve the aggregation processes, especially in documents WO 2005/085 326, WO 2005/082 979 and WO 2005/082 973. However, these powder adaptations generally have the drawback of considerably modifying the mechanical properties of the powders and thus those of the final 3D article. For example, document WO 2005/082 979 relates to the use of powders comprising a copolymer, copolyester and/or copolyamide (Vestamelt®) in the manufacture of articles according to a selective process (laser) of layer-by-layer powder aggregation. The examples of copolymers are especially PA 12/6/6.12 (in a mass percentage ratio of 40/30/30) and PA 12/6/6.6 (in a mass percentage ratio of 33/33/33 or of 60/25/15). The use of these copolymer powders is directed toward implementing the aggregation process at lower temperatures than with conventional powders. The materials obtained with the copolymer powders described are soft and do not have a sufficient modulus or sufficient resistance to the working temperatures, for example at room temperature, or at the heating temperature of an engine in the aeronautical or motor vehicle field, or alternatively in the information technology field (heat given off by batteries).

One aim of the present invention is thus to increase the difference between the Tf and the Tc of polyamide powders while at the same time conserving their mechanical properties, in order for the final article obtained by aggregation of these powders to have properties that are compatible with its use. In particular, the material of the final article should have sufficient strength and flexibility, in particular with an elastic modulus of greater than 1500 N/mm$^2$ and an elongation at break of greater than 15% and preferably greater than 20%.

The Applicant Company has now found a process for manufacturing polyamides that are designed to satisfy these various requirements. The process according to the invention is a process for increasing the difference Tf–Tc of polyamides, which is simple, quick (in one step) and which produces few residual monomers. The process of the invention concerns the mechanical properties (breaking modulus and elongation at break) of the usual polyamides in the powders obtained, and likewise in 3D articles, such as those obtained via the techniques of aggregation by electromagnetic radiation-mediated melting of these powders.

SUMMARY OF THE INVENTION

One subject of the present invention is thus the use of at least one minor comonomer in a process for polymerizing at least one major monomer in order to reduce the crystallization temperature and the melting temperature of a polyamide derived from the polymerization of said at least one major monomer, and in order for the decrease in crystallization temperature to be greater than the decrease in melting temperature, respectively, relative to the crystallization temperature and the melting temperature of the polyamide resulting from the polymerization of said at least one major monomer, said melting and crystallization temperatures being measured by DSC according to standard ISO 11357-3, said at least one minor comonomer being polymerized according to the same polymerization process as said at least one major monomer, and said at least one minor comonomer being chosen from aminocarboxylic acids, diamine-diacid couples, lactams and/or lactones, and said at least one minor comonomer representing from 0.1% to 20% by mass of the total blend of said monomer(s) and comonomer(s), preferably from 0.5% to 15% by mass of said total blend, and preferably from 1% to 10% by mass of said total blend.

Advantageously, the polymerization between the various minor and major monomers is an anionic polymerization.

Advantageously, the polymerization between the various minor and major monomers is a hydrolytic polycondensation.

Advantageously, said at least one major monomer comprises 11-aminoundecanoic acid and/or lactam 12 and/or the decanediamine-sebacic acid couple (10/10).

Advantageously, said at least one minor comonomer is chosen from aminocarboxylic acids, preferably α,ω-aminocarboxylic acids, comprising from 4 to 18 carbon atoms, diamine-diacid couples comprising from 4 to 18 carbon atoms, lactams comprising from 3 to 18 carbon atoms, lactones comprising from 3 to 18 carbon atoms, and mixtures thereof.

Advantageously, said at least one minor comonomer comprises 11-aminoundecanoic acid, 11-n-heptylaminoundecanoic acid, lauryllactam, caprolactam and/or caprolactone.

Advantageously, said at least one minor comonomer comprises at least one of the following diamine-diacid couples: 6.6, 6.10, 6.11, 6.12, 6.14, 6.18, 10.10, 10.12, 10.14, 10.18, 10.T, T being terephthalic acid.

A subject of the present invention is also a process for reducing the crystallization temperature and the melting temperature of a polyamide (homopolyamide or copolyamide) derived from the polymerization of at least one major monomer, in which the reduction of the crystallization temperature is greater than the reduction of the melting temperature, said process comprising a step of polymerizing said at least one major monomer with at least one different minor comonomer polymerized according to the same polymerization process as said at least one major monomer, said at least one minor comonomer being chosen from aminocarboxylic acids, diamine-diacid couples, lactams and/or lactones, and said at least one minor comonomer representing from 0.1% to 20% by mass of the total blend of said monomer(s) and comonomer(s), preferably from 0.5% to 15% by mass of said total blend and preferably from 1% to 10% by mass of said total blend.

Even more preferably, said at least one minor comonomer represents from 1% to 7% by mass of the total blend of said monomer(s) and comonomer(s), preferably from 1% to 5% by mass of said total blend, and said at least one minor comonomer comprises 11-aminoundecanoic acid and/or lauryllactam and/or caprolactam and/or caprolactone and/or at least one of the following diamine-diacid couples: 6.6, 6.10, 6.11, 6.12, 6.14, 6.18, 10.10, 10.12, 10.14, 10.18 and/or 10.T, T being terephthalic acid.

According to one embodiment of the process of the invention, the polymerization between the various minor and major monomers is an anionic polymerization. According to another embodiment of the process of the invention, the polymerization between the various minor and major monomers is a hydrolytic polycondensation.

Advantageously, said at least one major monomer comprises 11-aminoundecanoic acid and/or lactam 12 and/or the decanediamine-sebacic acid couple (10.10).

Advantageously, said process also comprises, after said polymerization step, at least one step chosen from: dissolution, precipitation, extrusion, atomization, spraying, cold nebulization, hot nebulization, milling, cryogenic milling, screening, viscosity raising, and combinations thereof.

A subject of the present invention is also a copolyamide or copolyesteramide powder, which may be manufactured according to the process defined previously, said powder being derived from the polymerization of at least two different monomers polymerized according to the same polymerization process, at least one of the comonomers being minor and chosen from aminocarboxylic acids, diamine-diacid couples, lactams and/or lactones, and said at least one minor-comonomer representing from 0.1% to 20% by mass of the total blend of said monomer(s) and comonomer(s), preferably from 0.5% to 15% by mass of said total blend, and preferably from 1% to 10% by mass of said total blend. Even more preferably, said at least one minor comonomer represents from 1% to 7% by mass of the total blend of said monomer(s) and comonomer(s), preferably from 1% to 5% by mass of said total blend, and said at least one minor comonomer comprises 11-aminoundecanoic acid and/or lauryllactam and/or caprolactam and/or caprolactone and/or at least one of the following diamine-diacid couples: 6.6, 6.10, 6.11, 6.12, 6.14, 6.18, 10.10, 10.12, 10.14, 10.18 and/or 10.T, T being terephthalic acid.

According to one embodiment, the powder of the invention comprises an 11-aminoundecanoic acid major monomer and at least one minor monomer chosen from the hexamethylenediamine-adipic acid couple (6.6), lauryllactam, caprolactam and/or caprolactone. According to another embodiment, the powder comprises a lauryllactam major monomer and a minor monomer chosen from caprolactam, caprolactone and/or the hexamethylenediamine-adipic acid couple (6.6).

Preferably, the powder according to the invention is chosen from the following polyamides: PA 11/6.6 comprising from 1% to 7% of 11-aminoundecanoic acid, PA 11/N-heptylamino acid comprising from 1% to 5% of N-heptylamino acid, PA 12/11 comprising from 1% to 12% and preferably from 2% to 5% of 11-aminoundecanoic acid, and PA 12/6 comprising from 1% to 5% of lactam 6, all the percentages being given as mass relative to the total mass of the blend of monomer and comonomer of each preferred PA.

A subject of the present invention is also the use of the powder according to the invention as defined previously, in coatings, such as paints, varnishes, anticorrosion compositions, textile coatings, cosmetics; paper additives; powder aggregation technologies via electromagnetic radiation-mediated melting or sintering for the manufacture of articles; electrophoresis gels, multilayer composite materials; the packaging industry; the toy industry; the textile industry; the motor vehicle industry and/or the electronics industry.

A subject of the present invention is also a process for manufacturing polyamide articles by powder aggregation via electromagnetic radiation-mediated melting, the polyamide powder having been obtained beforehand according to the process defined previously or being in accordance with the powder defined previously.

A subject of the present invention is also a manufactured article obtained by electromagnetic radiation-mediated melting of a powder according to the invention.

BRIEF DESCRIPTION OF THE DRAWINGS

FIG. 1 is a graph of Tc versus Tf.

DETAILED DESCRIPTION

The process of the invention makes it possible simultaneously to reduce the crystallization temperature and the melting temperature of polyamides. However, the process of the invention substantially reduces the crystallization temperature of polyamides, whereas the melting temperature remains virtually unchanged. This results in polyamides for which the difference Tf–Tc is greater as an absolute value compared with the usual polyamides not manufactured according to the process of the invention.

For the purposes of the invention, the term "polyamide" means products of condensation of lactams, amino acids or diacids with diamines and, as a general rule, any polymer formed by units connected together via amide groups.

The process of the invention involves polymerizing at least two different monomers, known as "comonomers", i.e. at least one monomer and at least one comonomer (monomer different than the first monomer) to form a copolymer such as a copolyamide, abbreviated as CoPA, or a copolyesteramide, abbreviated as CoPEA, as defined hereinbelow.

In the description that follows, the term "monomer" should be understood in the sense of a "repeating unit". The case in which a repeating unit is formed from the combination of a diacid with a diamine is particular. It is considered that it is the combination of a diamine and a diacid, i.e. the diamine-diacid couple (in equimolar amount) that corresponds to the monomer. This may be explained by the fact that, individually, the diacid or the diamine is only a structural unit, which is insufficient in itself to form a polymer.

The process of the invention comprises the polymerization of at least one major monomer, i.e. a monomer representing at least 80% by mass of the total mass of the monomer blend, and at least one minor comonomer, representing not more than 20% by mass of the total mass of the total blend of said monomer(s) and comonomer(s).

The polymerization of the major monomer(s) may be performed using one or more amide monomers individually comprising from 4 to 30 carbon atoms and preferably from 8 to 28 carbon atoms.

According to the invention, said at least one minor comonomer represents from 0.1% to 20% by mass of said total blend of said monomer(s) and comonomer(s), preferably from 0.5% to 15% by mass of said total blend, preferably from 1% to 10% by mass of said total blend. Even more preferably, said at least one minor comonomer represents from 1% to 7% by mass of the total blend of said monomer(s) and comonomer(s), preferably from 1% to 5% by mass of said total blend.

According to a first embodiment, the process for increasing the difference Tf–Tc of polyamide-based powders (homopolyamide or copolyamide) comprises the manufacture of CoPA powders from:

at least one major monomer, corresponding to the constituent monomer(s) of the base polyamide whose difference Tf–Tc it is desired to increase, and [0046] and at least one different minor comonomer.

The term "copolyamide" (abbreviated as CoPA) means products of polymerization of at least two different monomers chosen from:

monomers of amino acid or aminocarboxylic acid type, and preferably α,ω-aminocarboxylic acids;

monomers of lactam type containing from 3 to 18 carbon atoms on the main ring, and which may be substituted;

monomers of "diamine-diacid" type derived from the reaction between an aliphatic diamine containing between 4 and 18 carbon atoms and a dicarboxylic acid containing between 4 and 18 carbon atoms; and mixtures thereof, with monomers having a different number of carbons in the case of blends between a monomer of amino acid type and a monomer of lactam type.

Monomers of Amino Acid Type:

Examples of α,ω-amino acids that may be mentioned include those containing from 4 to 18 carbon atoms, such as aminocaproic acid, 7-aminoheptanoic acid, 11-aminoundecanoic acid, 11-n-heptylaminoundecanoic acid and 12-aminododecanoic acid.

Monomers of Lactam Type:

Examples of lactams that may be mentioned include those containing from 3 to 18 carbon atoms on the main ring and which may be substituted. Examples that may be mentioned include .beta..,beta.-dimethylpropiolactam, α,α-dimethylpropiolactam, amylolactam, caprolactam, also known as lactam 6, capryllactam, also known as lactam 8, oenantholactam, 2-pyrrolidone and lauryllactam, also known as a lactam 12.

Monomers of "Diamine-Diacid" Type:

Examples of dicarboxylic acids that may be mentioned include acids containing between 4 and 18 carbon atoms. Examples that may be mentioned include adipic acid, sebacic acid, azelaic acid, suberic acid, isophthalic acid, butanedioic acid, 1,4-cyclohexanedicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid HOOC—$(CH_2)_{10}$—COOH.

Examples of diamines that may be mentioned include aliphatic diamines containing from 4 to 18 atoms, which may be aryl and/or saturated cyclic diamines. Examples that may be mentioned include hexamethylenediamine, piperazine, tetramethylenediamine, octamethylene-diamine, decamethylenediamine, dodecamethylenediamine, 1,5-diaminohexane, 2,2,4-trimethyl-1,6-diaminohexane, diamine polyols, isophorone diamine (IPD), methylpenta-methylenediamine (MPDM), bis(aminocyclohexyl)methane (BACM), bis(3-methyl-4-aminocyclohexyl)methane (BMACM), meta-xylylenediamine, bis(p-aminocyclohexyl)methane and trimethylhexamethylenediamine.

Examples of monomers of "diamine-diacid" type that may be mentioned include those resulting from the condensation of hexamethylenediamine with a C6 to C36 diacid, especially the monomers: 6.6, 6.10, 6.11, 6.12, 6.14, 6.18. Mention may be made of monomers resulting from the condensation of decanediamine with a C6 to C36 diacid, especially the monomers: 10.10, 10.12, 0.10.14, 10.18; or resulting from the condensation of decane-diamine with a terephthalic acid, i.e. the monomer 10.T.

As examples of copolyamides formed from the various types of monomers described above, mention may be made of copolyamides resulting from the condensation of at least two α,ω-aminocarboxylic acids or from two lactams or from one lactam and one α,ω-aminocarboxylic acid. Mention may also be made of copolyamides resulting from the condensation of at least one α,ω-aminocarboxylic acid (or a lactam), at least one diamine and at least one dicarboxylic acid. Mention may also be made of copolyamides resulting from the condensation of an aliphatic diamine with an aliphatic dicarboxylic acid and at least one other monomer chosen from aliphatic diamines different than the preceding one and aliphatic diacids different than the preceding one.

Examples of copolyamides that may be mentioned include copolymers of caprolactam and of lauryllactam (PA 6/12), copolymers of caprolactam, of hexamethylene-diamine and of adipic acid (PA 6/6.6), copolymers of caprolactam, of lauryllactam, of hexamethylenediamine and of adipic acid (PA 6/12/6.6), copolymers of caprolactam, of hexamethylenediamine and of azelaic acid, of 11-aminoundecanoic acid, and of lauryllactam (PA 6/6.9/11/12), copolymers of caprolactam, of adipic acid and of hexamethylenediamine, of 11-aminoundecanoic acid, of lauryllactam (PA 6/6.6/11/12), copolymers of hexamethylenediamine, of azelaic acid and of lauryllactam (PA 6.9/12), copolymers of 2-pyrrolidone and of caprolactam (PA 4/6), copolymers of 2-pyrrolidone and of lauryllactam (PA 4/12), copolymers of caprolactam and of 11-aminoundecanoic acid (PA 6/11), copolymers of lauryllactam and of capryllactam (PA 12/8), copolymers of 11-aminoundecanoic acid and of 2-pyrrolidone (PA 11/4), copolymers of capryllactam and of caprolactam (PA 8/6), copolymers of capryllactam and of 2-pyrrolidone (PA 8/4), copolymers of lauryllactam and of capryllactam (PA 12/8), copolymers of lauryllactam and of 11-aminoundecanoic acid (PA 12/11).

Advantageously, said at least one major monomer and/or said at least one minor comonomer used in the process of the invention comprise(s) 11-aminoundecanoic acid or lactam 12.

According to a second embodiment of the invention, the process for increasing the difference Tf–Tc of polyamide-based powders includes the manufacture of copolyester-amide (CoPEA) powders, by polymerization of at least one major monomer, corresponding to the constituent monomer(s) of the base polyamide whose difference Tf–Tc it is desired to increase, and of at least one minor comonomer, comprising a lactone.

The process for preparing these copolyesteramide powders via anionic polymerization is described in document EP 1 172 396.

The major monomers that may be used to manufacture the copolyesteramides are the same as those described above. At least one lactam, preferably chosen from caprolactam and lauryllactam, is advantageously used. Examples of lactones that may be mentioned include caprolactone, valerolactone and butyrolactone. Caprolactone and/or butyrolactone is preferably used.

As regards the copolyesteramides, said at least one major monomer and said at least one minor comonomer comprising the lactone are advantageously used in the following respective proportions of major-minor monomers (mass %) ranging from: 80-20% to 99.5-0.5% (the total being 100%).

According to a third embodiment, the process according to the invention uses blends of copolyamide and/or of copolyesteramide.

According to the process of the invention, the CoPAs or the CoPEAs, and similarly the various monomers (minor and major) included in the composition of these CoPAs or CoPEAs, in particular the possible monomers of diamine-diacid type, are derived from the same polymerization process, irrespective of its type: hydrolytic polycondensation, anionic polymerization, cationic polymerization, etc.

According to one embodiment of the process of the invention, the polymerization between the various monomers (minor and major) is of the hydrolytic polycondensation type. Hydrolytic polymerization, used above all for lactams, is induced by water at high temperature. For example, the hydrolytic polymerization of lactams consists in opening the lactam with water and then in heating under pressure to polymerize. Optionally, a catalyst such as phosphoric acid may also be employed in the hydrolytic process.

As examples of CoPAs or CoPEAs derived from hydrolytic polymerization, mention may be made of those comprising an 11-aminoundecanoic acid major monomer and at least one minor monomer chosen from the hexamethylenediamine-adipic acid couple (6.6), lauryllactam, caprolactam and/or 11-n-heptylaminoundecanoic acid.

According to another embodiment of the process of the invention, the polymerization between the various monomers (minor and major) is of the anionic polymerization type. Anionic polymerization is performed at temperatures much lower than those used for hydrolytic or cationic mechanisms. Anionic polymerization is performed continuously or, preferably, in batch mode in a solvent. The anionic route more specifically concerns cyclic molecules, such as lactams and lactones. For example, the mechanism of anionic polymerization of lactams proceeds in three steps: an initiation step to form the lactamate anion, then an activation reaction which leads to the acyllactam and finally a propagation step. The anionic polymerization method is thus based essentially on the use of a catalyst and an activator optionally in the presence of a finely divided mineral or organic filler that serves as a crystallization seed and in the presence of an amide. The process is described in patents EP 192 515 and EP 303 530.

As regards the catalyst, mention may be made of sodium or a compound thereof, such as sodium hydride or sodium methoxide.

As regards the activator, mention may be made of lactam-N-carboxyanilides, isocyanates, carbodiimides, cyanimides, acyllactams, triazines, ureas, N-substituted imides and esters, inter alia.

As regards the filler, mention may be made of PA powder, for example Orgasol® powder, silica, talc, etc.

As regards the N,N'-alkylenebisamide, mention may be made more particularly of N,N'-ethylenebisstearamide (EBS), N,N'-ethylenebisoleamide, N,N'-ethylene-bispalmitamide, gadoleamide, cetoleamide and erucamide, N,N'-dioleyldipamide and N,N'-dierucylamide, etc.

As examples of CoPAs or CoPEAs derived from anionic polymerization, mention may be made of those comprising a lauryllactam major monomer and a minor monomer chosen from caprolactam, caprolactone and/or the hexamethylenediamine-adipic acid couple (6.6).

The very narrow particle size distribution of the powders advantageously obtained by anionic polymerization promotes their use for the manufacture of parts via radiation-mediated aggregation (infrared, UV curing, etc.) since it leads to a very fine definition of the parts, and it reduces the problems of formation of dusts during the use of the powder. Furthermore, the molecular mass of the polymer does not increase, even after long exposure to temperatures close to and below the melting temperature of the powder. This means that the powder can be recycled a large number of times without modification of its behavior during the manufacture of parts via radiation-mediated aggregation, the properties of said parts also remaining constant during the process. In addition, this process allows the manufacture via powder aggregation of an article that has good mechanical properties.

Needless to say, any other polymerization process may also be envisioned provided that all the (co)monomers used for manufacturing a CoPA or a CoPEA according to the invention can be polymerized together in the same polymerization process.

As an additional example, mention may be made of cationic polymerization, catalyzed with acids under anhydrous conditions. In this case, acids such as hydrochloric acid, phosphoric acid or hydrobromic acid are the most reactive, but the use of Lewis acids or ammonium salts is also possible. There are essentially two types of activation and of chain growth. Either the activated monomer reacts with the neutral reactive center, or it is the reactive center that is activated and the monomer is neutral.

Depending on the mode of synthesis, CoPA or CoPEA powder or CoPA or CoPEA granules are obtained directly. There are two production modes for obtaining CoPA or CoPEA powder: directly or indirectly.

In the case of the direct route, mention may be made of polymerization and precipitation (precipitating polymerization) of the polymer in a solvent. Powder is obtained directly during the polymerization. This is generally the case in anionic polymerization.

In the case of the indirect route for obtaining powder, examples that may be mentioned include dissolution-precipitation, i.e. solubilization of the CoPA or CoPEA polymer in a hot solvent followed by precipitation of the powder by slow cooling. Mention may also be made of atomization, i.e. spraying of a solution of the cooled polymer. This technique is also known as "cold nebulization" or "spray cooling". There is also a process of polymer extrusion, followed by atomization with a heated high-pressure nozzle, and then cooling of the powder obtained. This technique is also known as "hot nebulization" or "spray drying". Mention may also be made of the milling/screening of polymer granules, optionally followed by raising the viscosity. The milling may be cryogenic. All these powder production techniques are already known to those skilled in the art.

For use in the aggregation technique via radiation-mediated melting, either powders or granules are used. The granules are particles of any shape from a few mm to 1 cm. They are, for example, granules obtained at an extruder outlet. Powders are preferentially used in the melting or sintering aggregation process. These powders may be up to 350 μm in size and are advantageously between 10 and 100 μm in size. Preferably, the D50 is 60 μm (i.e. 50% of the particles are less than 60 μm in size).

A subject of the present invention is also a copolyamide or copolyesteramide powder manufactured according to the process described previously, said powder being derived from the polymerization of at least two different monomers polymerized according to the same polymerization process, at least one of the comonomers being minor and chosen from aminocarboxylic acids, diamine-diacid couples, lactams and/or lactones as described previously, and said at least one minor comonomer representing 0.1% to 20% by mass of the total monomer blend, preferably from 0.5% to 15% by mass of the total monomer blend, preferably from 1% to 10% by mass of the total monomer blend. Even more preferably, said at least one minor comonomer represents from 1% to 7% by mass of the total blend of said monomer(s) and comonomer(s), preferably from 1% to 5% by mass of said total blend and said at least one minor comonomer comprises 11-aminoundecanoic acid and/or lauryllactam and/or caprolactam and/or caprolactone and/or at least one of the following diamine-diacid couples: 6.6, 6.10, 6.11, 6.12, 6.14, 6.18, 10.10, 10.12, 10.14, 10.18 and/or 10.T, T being terephthalic acid.

The powders according to the invention may also comprise additives that contribute toward improving the properties of the powder for its use in the aggregation technique. Examples that may be mentioned include pigments for coloration, $TiO_2$, fillers or pigments for infrared absorption, carbon black, mineral fillers for reducing the internal stresses, and flame-retardant additives. Additives for improving the mechanical properties (ultimate stress and elongation at break) of the parts obtained by melting may also be added. These fillers are, for example, glass fibers, carbon fibers, nanofillers, nanoclays and carbon nanotubes.

Introducing these fillers at the time of synthesis improves their dispersion and their efficacy.

The powders according to the invention may be advantageously used in coatings, paints, anticorrosion compositions, paper additives, powder aggregation techniques via radiation-mediated melting or sintering for the manufacture of articles, electrophoresis gels, multilayer composite materials, the packaging industry, the toy industry, the textile industry, the motor vehicle industry and/or the electronics industry.

A subject of the present invention is also a process for manufacturing polyamide articles by melt-induced powder aggregation via radiation, the polyamide powder having been obtained beforehand according to the process mentioned above. Examples of radiation that may be mentioned include that provided by a laser beam (the process is then known as "laser sintering"). Mention may also be made of the process in which a mask is deposited between the layer of powder and the radiation source, the powder particles protected from the radiation by the mask not being aggregated.

A subject of the present invention is also a manufactured 3D article obtained by melting of a powder using electromagnetic radiation. This article may be chosen from prototypes and models, especially in the motor vehicle, nautical, aeronautics, aerospace, medical (prostheses, auditive systems, cell tissues, etc.), textile, clothing, fashion, decorative, electronic casing, telephony, home automation, information technology and lighting sectors.

EXAMPLES

The examples that follow illustrate embodiments of the present invention-without, however, limiting it.

In all the examples that follow:

the mean diameters (by volume) are determined from the particle size distribution measured using a Coulter LS230 granulometer, with version 2.11a of the software, the relative viscosities are measured at 20° C., as a solution at 0.5% by mass in meta-cresol ("Ato method"), analysis of the powders or granules (measurement of the thermal characteristics) is performed by DSC according to standard ISO 11357-3 "Plastics—Differential Scanning calorimetry (DSC) Part 3: Determination of temperature and enthalpy of melting and crystallization". The temperatures here that are more particularly of interest to the invention are the melting temperature during the first heating (Tf1) and the crystallization temperature (Tc). Specifically, as is known to those skilled in the art (in the field of manufacture of 3D articles by melt-induced powder aggregation), the difference "Tf–Tc" corresponds to Tf1–Tc.

In the examples that follow, the difference Tf–Tc or the difference Tf1–Tc is thus indicated independently.

Example 1

The comparative products 1 and the products of Examples 1.1 to 1.3 are prepared according to the same procedure in the following manner:

Comparative Example 1

2757 ml of solvent and then 899 g of lactam 12 (lauryllactam), 7.2 g of EBS and 3.94 g of organic filler, namely polyamide 12 powder (PA 12: Orgasol® 2001 EXD NAT1) are successively introduced into a reactor maintained under nitrogen. After starting the stirring at 300 rpm, the mixture is heated gradually to 105° C., and 360 ml of solvent are then distilled off so as to entrain azeotropically any trace of water that may be present.

After returning to atmospheric pressure, the anionic catalyst, 2.7 g of sodium hydride at a purity of 60% in oil, is then added rapidly under nitrogen and the stirring is increased to 550 rpm under nitrogen at 105° C. for 30 minutes.

By means of a small metering pump, the chosen activator, namely stearyl isocyanate (19.2 g. made up to 220.5 g with solvent) is injected continuously into the reaction medium according to the following program: 26 g/hour of isocyanate solution for 180 minutes 71.25 g/hour of isocyanate solution for 120 minutes.

In parallel, the temperature is maintained at 105° C. for 180 minutes during the injection, and is then raised to 130° C. over 90 minutes and maintained at 130° C. for a further 150 minutes after the end of introduction of the isocyanate.

Once the polymerization is complete, the reactor is virtually clean. After cooling to 80° C., separation by settling and drying, the powder obtained is subjected to DSC analysis.

The DSC analysis shows the values Tf=183.7° C. and Tc=139.1° C.

The powders of Examples 1 to 3 are manufactured according to the same procedure as in the Comparative Example 1. In these Examples 1 to 3 according to the invention, a small amount of lactam 6 comonomer is used in addition to the lactam 12.

Example 1.1

2757 ml of solvent and then 899 g of lactam 12, 18 g of lactam 6, 7.2 g of EBS and 3.94 g of Orgasol® 2001 EXD NAT1 (PA 12 powder) are successively introduced into the reactor maintained under nitrogen.

The DSC analysis of the powder obtained shows that Tf=180.1° C. and Tc=135.3° C.

Example 1.2

2757 ml of solvent and then 899 g of lactam 12, 36 g of lactam 6, 7.2 g of EBS and 3.94 g of Orgasol® 2001 EXD NAT1 (PA 12 powder) are successively introduced into the reactor maintained under nitrogen.

The DSC analysis of the powder obtained shows that Tf=179.3° C. and Tc=132.8° C.

Example 1.3

2757 ml of solvent and then 899 g of lactam 12, 45 g of lactam 6, 7.2 g of EBS and 3.94 g of Orgasol® 2001 EXD NAT1 (PA 12 powder) are successively introduced into the reactor maintained under nitrogen.

The DSC analysis of the powder obtained shows that Tf=178.2° C. and Tc=128.4° C.

The DSC analysis results for Comparative Example 1 and Examples 1.1 to 1.3 are summarized in Table 1.

TABLE 1

|  | Comparative 1 | Example 1.1 | Example 1.2 | Example 1.3 |
|---|---|---|---|---|
| Lactam 6 (g) | 0 | 18 | 36 | 45 |
| Lactam 12 (g) | 899 | 899 | 899 | 899 |
| Monomer/comonomer percentage: 12/6 (%) | 100/0 | 98/2 | 96/4 | 95/5 |
| EBS (g) | 1.2 | 7.2 | 7.2 | 7.2 |
| Organic filler (g) (PA 12) | 3.94 | 3.94 | 3.94 | 3.94 |
| Stearyl isocyanate (g) | 19.2 | 19.2 | 19.2 | 19.2 |
| NaH (g) | 2.7 | 2.7 | 2.7 | 2.7 |
| Melting temperature Tf1 (° C.) | 183.7 | 180.1 | 179.3 | 178.2 |
| Crystallization temperature (° C.) | 139.1 | 135.3 | 132.8 | 128.4 |
| |Tf − Tc| | 44.6 | 44.8 | 46.5 | 49.8 |
| Relative viscosity of the final powder | 1.32 | 1.25 | 1.19 | 1.25 |
| Mean diameter (μm) | 46 | 60 | 85 | 297 |

The samples of Examples 1.1 to 1.3 according to the invention, which contain a lauryllactam major monomer (lactam 12) and a caprolactam minor monomer (lactam 6), have a lower melting temperature and crystallization temperature and a greater difference |Tf−Tc| than Comparative Example 1 (lactam 12 homopolyamide).

In a melt-induced powder aggregation machine, use of the copolyamides of Examples 1.1 to 1.3 makes it possible more easily to optimize the machine settings. Their greater difference |Tf−Tc| affords a wider working or transformation window (greater than 10° C.). This wide window affords a person skilled in the art greater flexibility for adjusting the parameters (especially the temperature) of the machine and thus for avoiding "caking", on the one hand, and "curling", on the other hand, of the manufactured parts.

The various powders according to the invention are each introduced into a melt-induced powder aggregation machine and are subjected to laser radiation. After cooling the various specimens obtained, they are evaluated visually by a panel of experts.

Table 2 below shows the influence of the process of the invention on the magnitude of the powder "caking" or "setting" or "lumps" or "clumps" defects at the surface of a 3D article obtained by laser sintering.

TABLE 2

|  | Powders used for the laser sintering |  | Lactam 6 (%) | Caking problem |
|---|---|---|---|---|
|  | Comparative 1 | PA 12 | 0 | Caking |
| Examples according to the invention | Example 0 | PA 12/6 | 1 | Caking divided by 3 |
|  | Example 1 | PA 12/6 | 2 | Very little caking (divided by 7) |
|  | Example 2 | PA 12/6 | 4 | No caking |
|  | Example 3 | PA 12/6 | 5 | No caking |

Furthermore, the parts thus obtained by laser sintering with the powders of Examples 1.1 to 1.3 have mechanical properties (especially the breaking modulus and the elongation at break) comparable to those of the Comparative Example 1.

Moreover, the anionic polymerization advantageously used in the process of the invention makes it possible to limit the amount of residual monomers in the final powder, which are liable to condense on the parts of the melt-induced powder aggregation machine. The precision of the 3D articles thus remains optimal and unchanged even after several manufacturing cycles.

Example 4

The graph of FIG. 1 illustrates the impact of the content of comonomer (in this case lactam 12 or monomer 6.6) in a polyamide 11 (PA 11) on the change in the difference between Tf and Tc. The graph shows that it is the comonomer 6.6 that most broadens the window (Tf−Tc) for contents of between 5% and 20%.

Example 5

A CoPA 11/6.6 powder (7% of 6.6) is synthesized from granules obtained from hydrolytic polymerization, which are reduced to powder by cryogenic milling. The powder obtained has a relative viscosity equal to 1 (20° C., as a solution at 0.5% by mass in meta-cresol).

This powder is compared with:

a PA 12 powder obtained anionically. The PA 12 powder has a relative viscosity equal to 1.3 (20° C., as a solution at 0.5% by mass in meta-cresol), a PA 11 powder synthesized by milling a prepolymer obtained by polycondensation of 11-aminoundecanoic acid, followed by treatment with water and raising of the viscosity. The PA 11 powder has a relative viscosity equal to 1.35 (20° C., as a solution at 0.5% by mass in meta-cresol).

The DSC analysis of the three powders shows the characteristics of Tf1 (first heating), Tf2 (second heating) and Tc collated in Table 3 below.

TABLE 3

| CoPA 11/6.6 Example 4 | PA 12 | PA 11 |
|---|---|---|
| Tf1 (first heating)/Tc/Tf2 (second heating) delta Tf1 − Tc (° C.) 178/129/170 49 | Tf1 (first heating)/Tc/Tf2 (second heating) delta Tf1 − Tc (° C.) 185/140/178 45 | Tf1 (first heating)/Tc/Tf2 (second heating) delta Tf1 − Tc (° C.) 203/156/189 47 |

The three powders are tested in a laser sintering machine.

By virtue of its difference in Tf–Tc equal to 49° C., the transformation window of the CoPA 11/6.6 powder in the machine is 14° C., which allows the SLS machine to be used under good conditions.

Furthermore, very little or no caking is observed with the CoPA 11/6.6 powder of the invention.

The mechanical properties of the parts manufactured by laser sintering from CoPA 11/6.6 are compared with those manufactured from PA 12 and PA 11 in Table 4 below.

TABLE 4

| Standards | Mechanical tests | | PA 12 | CoPA 11/6.6 Example 4 | PA 11 |
|---|---|---|---|---|---|
| ASTM D 638:91-1 | Elongation at break | % | 22.3 | 29.7 | 45 |
| | Tensile modulus | MPa | 1739 | 1786 | 1797 |

The parts manufactured from CoPA 11/6.6 have a modulus of 1786 MPa, which is close to that of PA 12 and PA 11, and an elongation at break in the range 25-30%. The elongation at break of CoPA 11/6.6 is between that of polyamide 12 and that of polyamide 11.

Example 6

The DSC values according to standard ISO 11357 are compared (Table 5) between a PA 12 (Comparative) and a polyamide 12 modified, respectively, with 6% and 12% by weight of 11-aminoundecanoic acid (examples according to the invention).

TABLE 5

| | Ato method | DSC standard ISO 11357-3 | | | |
|---|---|---|---|---|---|
| Compositions | Relative viscosity | 1st heating Tf1 (° C.) | 2$^{nd}$ heating Tf2 (° C.) | Cooling Tc (° C.) | Tf1 − Tc |
| PA 12 (Comparative) | 1.63 | 177 | 177.1 | 136.1 | 40.9 |
| CoPA 12/11 (6%) (according to the invention) lauryllactam (94%)/11-aminoundecanoic acid (6%) | 1.69 | 175.2 | 174 | 133.2 | 42 |
| CoPA 12/11 (12%) (according to the invention) lauryllactam (88%)/11-aminoundecaoic acid (12%) | 1.62 | 170.8 | 170.3 | 127.7 | 43.1 |

A decrease of 3 to 8° C. in the crystallization temperature and an increase in the difference Tf1-Tc are found for the two PA 12 modified according to the process of the invention, compared with the homopolyamide PA 12.

Example 7

The DSC values according to standard ISO 11357 are compared (in Table 6) between a PA 11 (Comparative) and a polyamide 11 modified, respectively, with 1% and 5% by weight of N-heptylamino acid (examples according to the invention).

TABLE 6

| | Mn | | DSC standard ISO 11357 | | | |
|---|---|---|---|---|---|---|
| Compositions | number-average molecular mass | Relative viscosity (Ato method) | 1st heating Tf1 | 2nd heating Tf2 | Cooling Tc | Tf1 − Tc |
| PA 11 (Comparative) | 23 000 | 1.45 | P: 192 D: 47.3 | P: 189.7 D: 59.2 | P: 157.6 D: −55.6 | 34.4 |
| PA 11 + 5% N-heptyl-amino acid (according to the invention) | 20 000 | 1.32 | P: 189 D: 52.1 | P: 188.1 D: 55.7 | P: 151.9 D: −51.8 | 37.1 |

TABLE 6-continued

| Compositions | Mn number-average molecular mass | Relative viscosity (Ato method) | DSC standard ISO 11357 | | | Tf1 − Tc |
| --- | --- | --- | --- | --- | --- | --- |
| | | | 1st heating Tf1 | 2nd heating Tf2 | Cooling Tc | |
| PA 11 + 1% N-heptyl-amino acid (according to the invention) | 23 000 | 1.48 | P: 192.7 D: 46.6 | P: 191.7 D: 51 | P: 152.6 D: −55.8 | 40.1 |

P: for Tf1, Tf2 and Tc, the measurement corresponds to the peak "P" (° C.)
D: corresponds to the enthalpy DH (J/g)

A decrease of 5 to 6° C. in the crystallization temperature is found for the two PA 11 modified according to the process of the invention, compared with the homopolyamide PA 11.

As regards the amount of minor comonomer used, it is noted that the difference Tf1–Tc is greater with 1% of N-heptylamino acid than with 5% of N-heptylamino acid.

The invention claimed is:

1. A process for reducing the crystallization temperature and the melting temperature of a polyamide powder derived from the polymerization of at least one major monomer, said process comprising polymerization of said at least one major monomer with at least one different minor comonomer polymerized according to the same polymerization process as said at least one major monomer, said at least one minor comonomer representing from 0.1% to 20% by mass of the total blend of said monomer(s) and comonomer(s), such that the reduction in the crystallization temperature is greater than the reduction in the melting temperature, relative to the crystallization temperature and the melting temperature of the polyamide obtained from the polymerization of said at least one major monomer alone,
wherein the change in the crystallization temperature is at least 3° C.

2. The process as claimed in claim 1, wherein said step of polymerization is an anionic polymerization.

3. The process as claimed in claim 1, wherein said step of polymerization is a hydrolytic polycondensation.

4. The process as claimed in claim 1, wherein said at least one major monomer is selected from the group consisting of 11-aminoundecanoic acid, lactam 12, decanediamine-sebacic acid couple (10.10) and mixtures thereof.

5. The process as claimed in claim 1, further comprising, after said polymerization step, at least one step selected from the group consisting of: dissolution, precipitation, extrusion, atomization, spraying, cold nebulization, hot nebulization, milling, cryogenic milling, screening, viscosity raising, and combinations thereof.

6. The process as claimed in claim 1, wherein the at least one minor comonomer is selected from the group consisting of 11-aminoundecanoic acid, lauryllactam, caprolactam, caprolactone, at least one diamine-diacid couples selected from the group consisting of: 6.6, 6.10, 6.11, 6.12, 6.14, 6.18, 10.10, 10.12, 10.14, 10.18 and 10.T, T being terephthalic acid, and mixtures thereof.

7. The process as claimed in claim 1, wherein said at least one minor comonomer represents from 0.1% to 12% by mass of the total blend of said monomer(s) and comonomer(s).

8. The process as claimed in claim 1, wherein said at least one minor comonomer represents from 0.1% to 7% by mass of the total blend of said monomer(s) and comonomer(s).

9. The process as claimed in claim 1, wherein said at least one minor comonomer represents from 0.1% to 1% by mass of the total blend of said monomer(s) and comonomer(s).

10. The process as claimed in claim 1, wherein the change in the crystallization temperature is at least 5° C.

11. A copolyamide or copolyesteramide powder obtained from the polymerization of at least two different monomers polymerized according to the same polymerization process, at least one of the monomers being major, at least one of the monomers being minor, said at least one minor monomers representing from 0.1% to 20% by mass of the total blend of said monomer(s), wherein the powder has a crystallization temperature and a melting temperature that are each reduced relative to a crystallization temperature and a melting temperature of a powder obtained from the polymerization of said at least one major monomer,
wherein the reduction in the crystallization temperature is greater than the reduction in the melting temperature,
wherein the change in the crystallization temperature is at least 3° C.

12. The powder as claimed in claim 11, wherein said at least one major monomer is selected from the group consisting of 11-aminoundecanoic acid, lactam 12, decanediamine-sebacic acid couple (10.10) and mixtures thereof.

13. The powder as claimed in claim 11, wherein said at least one major monomer comprises 11-aminoundecanoic acid and at least one minor monomer is selected from the group consisting of hexamethylenediamine-adipic acid couple (6.6), lauryllactam, caprolactam, caprolactone and mixtures thereof.

14. The powder as claimed in claim 11, comprising a lauryllactam major monomer and a minor monomer selected from the group consisting of caprolactam, caprolactone, hexamethylenediamine-adipic acid couple (6.6) and mixtures thereof.

15. The powder as claimed in claim 11, wherein said at least one minor comonomer represents from 0.1% to 12% by mass of the total blend of said monomer(s) and comonomer(s).

16. The powder as claimed in claim 11, wherein said at least one minor comonomer represents from 0.1% to 7% by mass of the total blend of said monomer(s) and comonomer(s).

17. The powder as claimed in claim 11, wherein said at least one minor comonomer represents from 0.1% to 1% by mass of the total blend of said monomer(s) and comonomer(s).

18. The powder as claimed in claim 11, wherein the change in the crystallization temperature is at least 5° C.

19. A process for manufacturing a polyamide article comprising melt-induced powder aggregation using electromagnetic radiation of the powder of claim 11.

20. The process as claimed in claim 19, wherein the at least one minor monomer is selected from the group consisting of 11-aminoundecanoic acid, lauryllactam, caprolactam, caprolactone, and at least one diamine-diacid couple selected from the group consisting of 6.6, 6.10, 6.11, 6.12, 6.14, 6.18, 10.10, 10.12, 10.14, 10.18 and 10.T, T being terephthalic acid.

21. A process for reducing the crystallization temperature and the melting temperature of a polyamide powder derived from a polymerization of at least one major monomer, said process comprising a step of polymerization of said at least one major monomer with at least one different minor comonomer polymerized according to the same polymerization process as said at least one major monomer, wherein said at least one minor comonomer represents from 0.1% to 20% by mass of the total blend of said monomer(s) and comonomer(s), such that the reduction in the crystallization temperature is greater than the reduction in the melting temperature, relative to the crystallization temperature and the melting temperature of the polyamide obtained from the polymerization of said at least one major monomer alone,
   wherein the polymerization is an anionic polymerization which includes the use of components selected from the group consisting of a catalyst, an activator, an organic filler, an amide or combinations thereof,
   wherein the change in the crystallization temperature is at least 3° C.

* * * * *